(12) United States Patent
Bansal et al.

(10) Patent No.: US 11,599,422 B2
(45) Date of Patent: Mar. 7, 2023

(54) SYSTEM AND METHOD FOR DEVICE INDEPENDENT BACKUP IN DISTRIBUTED SYSTEM

(71) Applicant: EMC IP Holding Company LLC, Hopkinton, MA (US)

(72) Inventors: Aaditya Rakesh Bansal, Bangalore (IN); Pravin Ashok Kumar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 843 days.

(21) Appl. No.: 16/161,827

(22) Filed: Oct. 16, 2018

(65) Prior Publication Data

US 2020/0117549 A1    Apr. 16, 2020

(51) Int. Cl.
| | | |
|---|---|---|
| *G06F 16/14* | (2019.01) | |
| *G06F 11/14* | (2006.01) | |
| *G06F 9/451* | (2018.01) | |
| *G06F 11/34* | (2006.01) | |
| *G06F 16/27* | (2019.01) | |

(52) U.S. Cl.
CPC .......... *G06F 11/1464* (2013.01); *G06F 9/451* (2018.02); *G06F 11/1451* (2013.01); *G06F 11/1461* (2013.01); *G06F 11/1469* (2013.01); *G06F 11/3409* (2013.01); *G06F 16/27* (2019.01)

(58) Field of Classification Search
None
See application file for complete search history.

(56) References Cited

U.S. PATENT DOCUMENTS

| | | |
|---|---|---|
| 5,483,637 A | 1/1996 | Winokur et al. |
| 5,867,714 A | 2/1999 | Todd et al. |
| 6,012,152 A | 1/2000 | Douik et al. |
| (Continued) | | |

FOREIGN PATENT DOCUMENTS

| | | |
|---|---|---|
| CN | 102984199 A | 3/2013 |
| CN | 104395855 A | 3/2015 |
| (Continued) | | |

OTHER PUBLICATIONS

Dell EMC Data Protection Advisor, Report Reference Guide 302-003-605 REV 1 (2017), pp. 1-25 (of 488), retrieved Nov. 29, 2020 from https://web.archive.org/web/20201129060023/https://www.delltechnologies.com/en-us/collaterals/unauth/technical-guides-support-information/products/networking-4/docu82478.pdf (Year: 2017).*

(Continued)

*Primary Examiner* — Amresh Singh
(74) *Attorney, Agent, or Firm* — Chamberlain, Hrdlicka, White, Williams & Aughtry

(57) ABSTRACT

A production host for hosting applications includes a persistent storage and a production agent. The persistent storage stores application data of the applications. The production agent obtains a backup analysis request for an application executing on the production host; in response to obtaining the backup analysis request: obtains an identity of the application; identifies backups in a backup storage, wherein the identified backups are associated with the identity of the application; performs a backup policy compliance analysis of the identified backups to generate a backup protection map for the application.

10 Claims, 12 Drawing Sheets

(56) References Cited

U.S. PATENT DOCUMENTS

| | | |
|---|---|---|
| 6,205,409 B1 | 3/2001 | Zvonar |
| 6,317,028 B1 | 11/2001 | Valiulis |
| 6,473,794 B1 | 10/2002 | Guheen et al. |
| 6,606,744 B1 | 8/2003 | Mikurak |
| 6,633,782 B1 | 10/2003 | Schleiss et al. |
| 6,742,141 B1 | 5/2004 | Miller |
| 6,795,935 B1 | 9/2004 | Unkle et al. |
| 6,871,224 B1 | 3/2005 | Chu et al. |
| 7,103,874 B2 | 9/2006 | McCollum et al. |
| 7,222,127 B1 | 5/2007 | Bem et al. |
| 7,334,222 B2 | 2/2008 | Keller |
| 7,370,102 B1 | 5/2008 | Chu et al. |
| 7,490,073 B1 | 2/2009 | Qureshi et al. |
| 7,500,142 B1 | 3/2009 | Cowart et al. |
| 7,516,362 B2 | 4/2009 | Connelly et al. |
| 7,536,595 B1 | 5/2009 | Hiltunen et al. |
| 7,757,124 B1 | 7/2010 | Singh et al. |
| 7,827,136 B1* | 11/2010 | Wang ............... G06F 11/2097 707/610 |
| 7,831,693 B2 | 11/2010 | Lai |
| 7,886,031 B1 | 2/2011 | Taylor et al. |
| 7,987,353 B2 | 7/2011 | Holdaway et al. |
| 8,001,527 B1 | 8/2011 | Qureshi et al. |
| 8,166,552 B2 | 4/2012 | Prafullchandra et al. |
| 8,290,970 B2 | 10/2012 | Hohmann, II |
| 8,386,930 B2 | 2/2013 | Dillenberger et al. |
| 8,401,982 B1 | 3/2013 | Satish et al. |
| 8,583,769 B1 | 11/2013 | Peters et al. |
| 8,639,798 B2 | 1/2014 | Akiyama et al. |
| 8,706,682 B1 | 4/2014 | Blazek et al. |
| 8,774,054 B2 | 7/2014 | Yin et al. |
| 8,826,077 B2 | 9/2014 | Bobak et al. |
| 8,868,987 B2 | 10/2014 | Wagner |
| 8,874,892 B1 | 10/2014 | Chan et al. |
| 8,938,621 B2 | 1/2015 | Mao et al. |
| 8,995,439 B2 | 3/2015 | Field |
| 9,122,501 B1 | 9/2015 | Hsu et al. |
| 9,122,739 B1 | 9/2015 | Yadwadkar et al. |
| 9,183,361 B2 | 11/2015 | Obasanjo et al. |
| 9,201,751 B1 | 12/2015 | Muthirisavenugopal et al. |
| 9,225,625 B1 | 12/2015 | He et al. |
| 9,229,902 B1 | 1/2016 | Leis et al. |
| 9,278,481 B2 | 3/2016 | Hull |
| 9,323,789 B1* | 4/2016 | Elliott, IV ............... G06F 11/14 |
| 9,355,036 B2 | 5/2016 | Beard et al. |
| 9,384,082 B1 | 7/2016 | Lee et al. |
| 9,407,505 B2 | 8/2016 | Bowen |
| 9,542,177 B1 | 1/2017 | Johansson et al. |
| 9,594,620 B2 | 3/2017 | Xia et al. |
| 9,703,644 B1* | 7/2017 | Jagannatha ......... G06F 11/1435 |
| 9,729,615 B2 | 8/2017 | Nair |
| 9,772,908 B1* | 9/2017 | Gupta ................. G06F 11/1461 |
| 9,864,634 B2 | 1/2018 | Kenkre et al. |
| 9,898,224 B1 | 2/2018 | Marshak et al. |
| 9,999,030 B2 | 6/2018 | Gu et al. |
| 10,048,996 B1 | 8/2018 | Bell et al. |
| 10,057,184 B1 | 8/2018 | Prahlad et al. |
| 10,097,620 B2 | 10/2018 | Reddy et al. |
| 10,514,907 B2 | 12/2019 | Chaganti et al. |
| 11,126,505 B1* | 9/2021 | Vig ..................... G06F 11/1451 |
| 2003/0149919 A1 | 8/2003 | Greenwald et al. |
| 2004/0078683 A1 | 4/2004 | Buia et al. |
| 2004/0088145 A1 | 5/2004 | Rosenthal et al. |
| 2004/0177168 A1 | 9/2004 | Alabraba et al. |
| 2004/0177354 A1 | 9/2004 | Gunyakti et al. |
| 2004/0225381 A1 | 11/2004 | Ritz et al. |
| 2004/0250260 A1 | 12/2004 | Pioso |
| 2005/0033770 A1 | 2/2005 | Oglesby et al. |
| 2005/0078656 A1 | 4/2005 | Bryant et al. |
| 2005/0120112 A1 | 6/2005 | Wing et al. |
| 2005/0144151 A1 | 6/2005 | Fischman et al. |
| 2005/0144188 A1 | 6/2005 | Bailey et al. |
| 2006/0117212 A1 | 6/2006 | Meyer et al. |
| 2006/0149408 A1 | 7/2006 | Speeter et al. |
| 2006/0178864 A1 | 8/2006 | Khanijo et al. |
| 2006/0179116 A1 | 8/2006 | Speeter et al. |
| 2006/0235962 A1 | 10/2006 | Vinberg et al. |
| 2007/0143851 A1 | 6/2007 | Nicodemus et al. |
| 2007/0202469 A1 | 8/2007 | Davidson |
| 2008/0034019 A1* | 2/2008 | Cisler .................. G06F 11/1458 |
| 2008/0037532 A1 | 2/2008 | Sykes et al. |
| 2008/0065700 A1 | 3/2008 | Lim |
| 2008/0201470 A1 | 8/2008 | Sayama |
| 2008/0228755 A1 | 9/2008 | Haga et al. |
| 2008/0262860 A1 | 10/2008 | Schneider et al. |
| 2009/0012805 A1 | 1/2009 | Schnell et al. |
| 2009/0113248 A1 | 4/2009 | Bock et al. |
| 2009/0165099 A1 | 6/2009 | Eldar et al. |
| 2009/0183010 A1 | 7/2009 | Schnell et al. |
| 2009/0260071 A1 | 10/2009 | Sadovsky et al. |
| 2009/0282283 A1 | 11/2009 | Sakakura et al. |
| 2009/0307333 A1* | 12/2009 | Welingkar ........... H04L 67/1095 709/219 |
| 2010/0024001 A1 | 1/2010 | Campbell et al. |
| 2010/0057677 A1 | 3/2010 | Rapp et al. |
| 2010/0180221 A1 | 7/2010 | Cloward et al. |
| 2010/0229022 A1 | 9/2010 | Anand et al. |
| 2010/0306489 A1 | 12/2010 | Abts et al. |
| 2010/0312522 A1 | 12/2010 | Laberge et al. |
| 2010/0318487 A1 | 12/2010 | Marvasti |
| 2010/0325493 A1 | 12/2010 | Morimura et al. |
| 2011/0078428 A1 | 3/2011 | Hamid |
| 2011/0093703 A1 | 4/2011 | Etchegoyen |
| 2011/0270482 A1 | 11/2011 | Holzer |
| 2011/0289342 A1 | 11/2011 | Schaefer et al. |
| 2011/0289343 A1 | 11/2011 | Schaefer et al. |
| 2011/0302305 A1 | 12/2011 | Morimura et al. |
| 2012/0016841 A1* | 1/2012 | Karonde ............. G06F 11/1451 707/641 |
| 2012/0041976 A1 | 2/2012 | Annapragada |
| 2012/0083917 A1 | 4/2012 | Zhou et al. |
| 2012/0110142 A1 | 5/2012 | Montagna et al. |
| 2012/0144244 A1 | 6/2012 | Dan et al. |
| 2012/0150926 A1 | 6/2012 | Adkins et al. |
| 2012/0166142 A1 | 6/2012 | Maeda et al. |
| 2012/0182151 A1 | 7/2012 | Tong et al. |
| 2012/0233216 A1 | 9/2012 | Lim |
| 2012/0265872 A1 | 10/2012 | Chilton |
| 2012/0271927 A1 | 10/2012 | Shakirzyanov et al. |
| 2012/0331526 A1 | 12/2012 | Caudle et al. |
| 2013/0151975 A1 | 6/2013 | Shadi et al. |
| 2013/0185667 A1 | 7/2013 | Harper et al. |
| 2013/0257627 A1 | 10/2013 | Rafael |
| 2013/0317870 A1 | 11/2013 | Franco et al. |
| 2013/0326029 A1 | 12/2013 | Flynn |
| 2014/0069291 A1 | 3/2014 | Yang et al. |
| 2014/0082417 A1 | 3/2014 | Barton et al. |
| 2014/0115176 A1 | 4/2014 | Kamboh et al. |
| 2014/0245085 A1 | 8/2014 | Halverson et al. |
| 2014/0281675 A1 | 9/2014 | Sreenivasan et al. |
| 2014/0304399 A1 | 10/2014 | Chaudhary et al. |
| 2014/0304402 A1 | 10/2014 | Prakash et al. |
| 2014/0324276 A1 | 10/2014 | Weaks |
| 2014/0344101 A1 | 11/2014 | Collet et al. |
| 2015/0106606 A1 | 4/2015 | Cao et al. |
| 2015/0117174 A1 | 4/2015 | Alber et al. |
| 2015/0120359 A1 | 4/2015 | Dongieux |
| 2015/0149822 A1 | 5/2015 | Coronado et al. |
| 2015/0256394 A1 | 9/2015 | Palmer et al. |
| 2015/0264012 A1 | 9/2015 | Rieke et al. |
| 2015/0324255 A1* | 11/2015 | Kochunni ................. G06F 3/065 711/162 |
| 2016/0042288 A1 | 2/2016 | Cohen et al. |
| 2016/0048611 A1 | 2/2016 | Cox et al. |
| 2016/0057009 A1 | 2/2016 | Kadayam et al. |
| 2016/0110240 A1 | 4/2016 | Reger et al. |
| 2016/0112504 A1 | 4/2016 | Mathur et al. |
| 2016/0173690 A1 | 6/2016 | Perez et al. |
| 2016/0294643 A1 | 10/2016 | Kim |
| 2016/0302323 A1 | 10/2016 | Gosselin |
| 2017/0017881 A1 | 1/2017 | Langley et al. |
| 2017/0032091 A1 | 2/2017 | Rudorfer et al. |
| 2017/0085644 A1 | 3/2017 | Chouhan et al. |
| 2017/0094003 A1 | 3/2017 | Gahlot et al. |

(56) References Cited

U.S. PATENT DOCUMENTS

| | | | |
|---|---|---|---|
| 2017/0206128 A1 | 7/2017 | Anderson et al. | |
| 2017/0228649 A1 | 8/2017 | Chatterjee et al. | |
| 2017/0242740 A1 | 8/2017 | Bell et al. | |
| 2017/0308420 A1* | 10/2017 | Korotaev | G06F 11/0763 |
| 2017/0339005 A1 | 11/2017 | Yuan et al. | |
| 2018/0025166 A1 | 1/2018 | Daniel et al. | |
| 2018/0034709 A1 | 2/2018 | Chen et al. | |
| 2018/0041388 A1 | 2/2018 | Moens et al. | |
| 2018/0285009 A1 | 10/2018 | Guim Bernat et al. | |
| 2018/0302277 A1 | 10/2018 | Shimamura et al. | |
| 2018/0321934 A1 | 11/2018 | Chaganti et al. | |
| 2018/0322019 A1 | 11/2018 | Stowell et al. | |
| 2018/0329579 A1 | 11/2018 | Kaimal et al. | |
| 2019/0123985 A1 | 4/2019 | Rao et al. | |
| 2019/0149408 A1 | 5/2019 | Li | |
| 2019/0182105 A1 | 6/2019 | Stephens et al. | |
| 2019/0303137 A1 | 10/2019 | Chaganti et al. | |
| 2019/0306013 A1 | 10/2019 | Ali et al. | |
| 2019/0324841 A1 | 10/2019 | Patel et al. | |
| 2020/0079403 A1 | 3/2020 | Setiawan et al. | |

FOREIGN PATENT DOCUMENTS

| | | |
|---|---|---|
| CN | 105164633 A | 12/2015 |
| CN | 106533753 A | 3/2017 |

OTHER PUBLICATIONS

Zhengyu Liang et al.; "ClusterProbe: An Open, Flexible and Scalable Cluster Monitoring Tool"; IEEE Computer Society International Workshop on Cluster Computing; pp. 261-268; 1999.

Coulouris et al.; "Distributed Systems: Concepts and Design, Fifth Edition"; Addison-Wesley; pp. 37-61; 2012.

Extended European Search Report issued in corresponding European Application No. 19151952.9, dated Jul. 1, 2019.

"Integrated Dell Remote Access Controller 8 (iDRACS): Version 2.05.05.05 User's Guide"; Dell Inc.; 2014.

Doug Iler et al.; "Introducing iDRACS with Lifecycle Controller for Dell 13th Generation PowerEdge Servers"; Dell Inc., A Dell Deployment and Configuration Guide; Sep. 2014.

Duncan Tweed; "BMC Atrium Discovery User Guide"; BMC Software, Inc.; Mar. 2014; retrieved from https://bmc.com/.

Duncan Tweed; "Baseline configuration"; BMC Software, Inc.; Apr. 7, 2015; retrieved from https://bmc.com/.

Masoom Parvez; "AutomaticGroup Node"; BMC Software, Inc.; 2014; retrieved from https://bmc.com/.

"Dell DRAC—Wikipedia"; XP055602141; Mar. 23, 2018; https://en.wikipedia.org/w/index.php?title=Dell_DRAC&oldid=831957421.

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

* cited by examiner

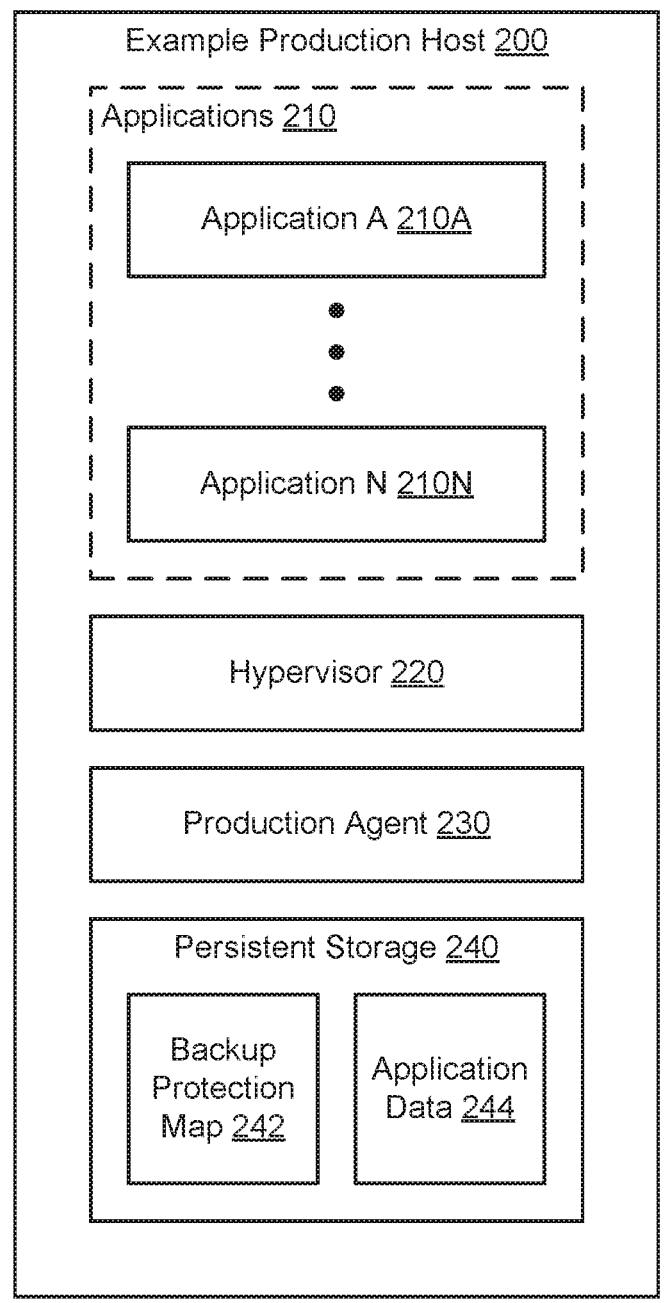
FIG. 2.1

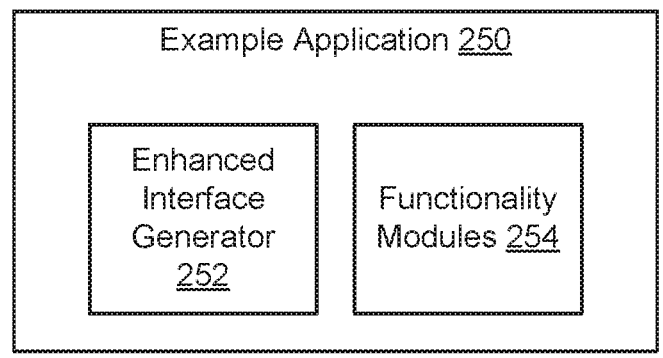
FIG. 2.2

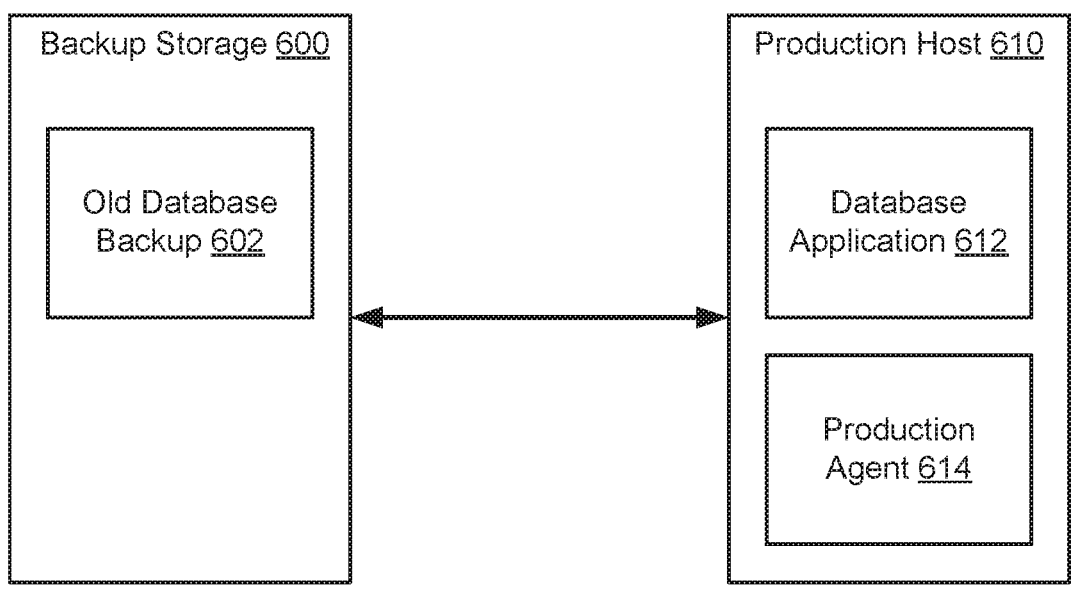
FIG. 6.1

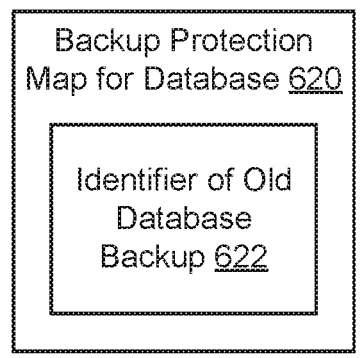
FIG. 6.2

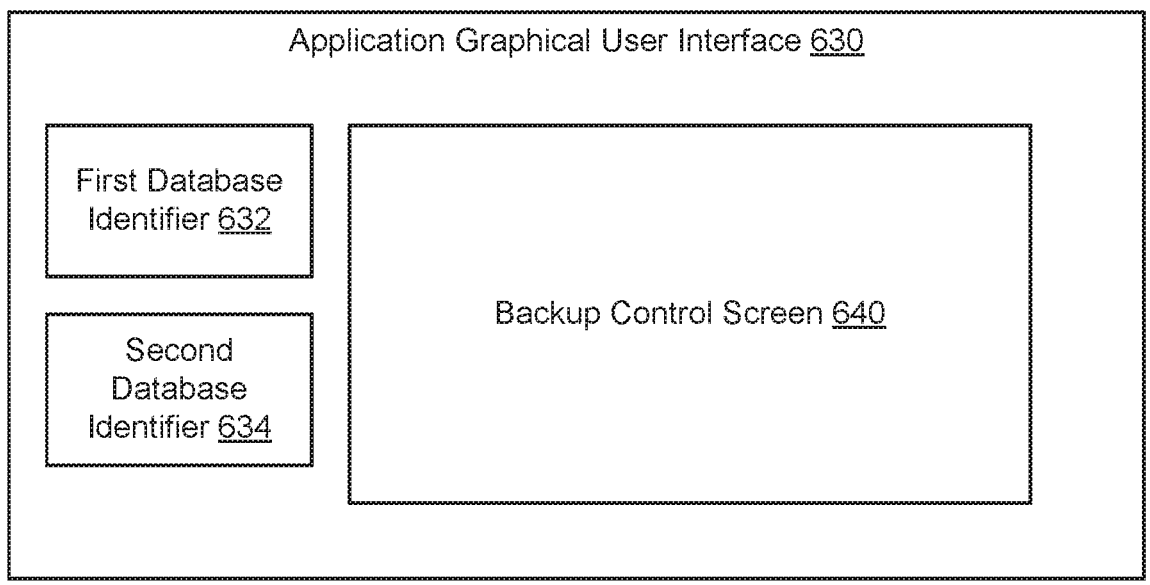
FIG. 6.3

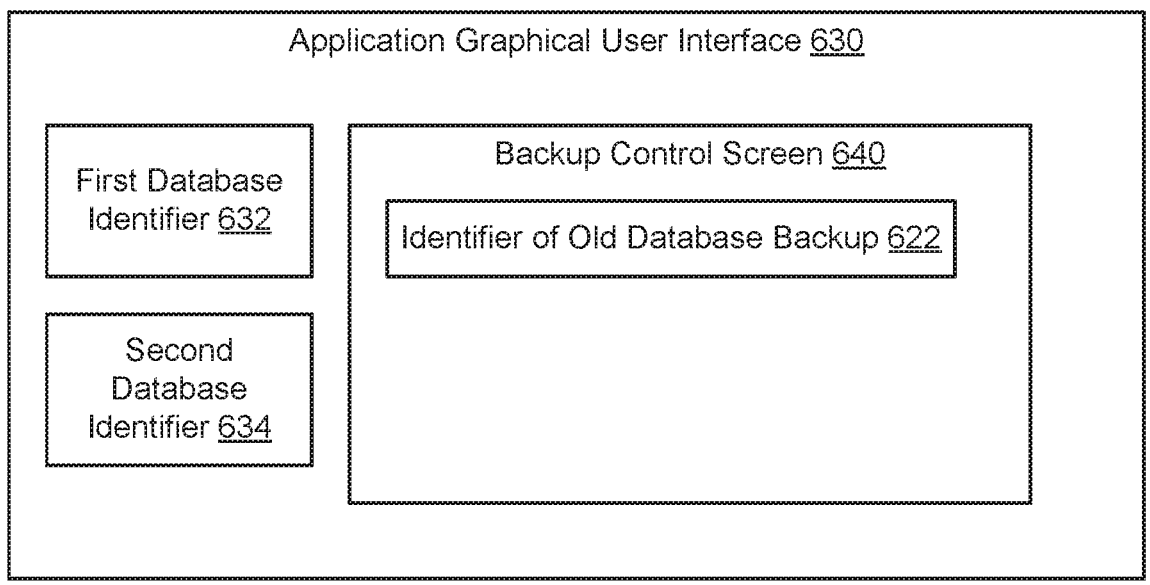
FIG. 6.4

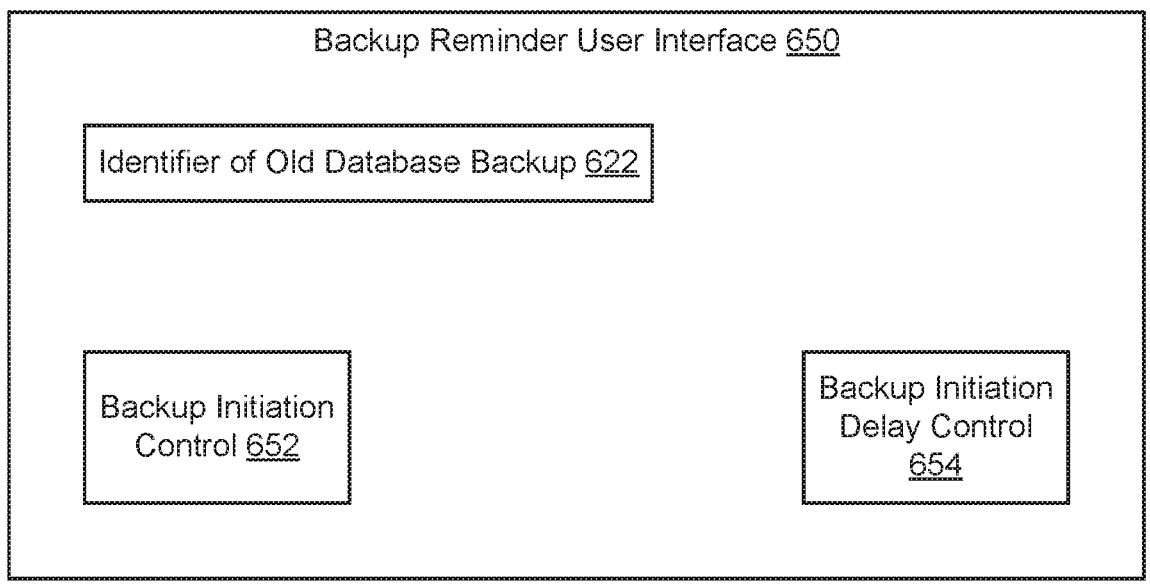
FIG. 6.5

SYSTEM AND METHOD FOR DEVICE INDEPENDENT BACKUP IN DISTRIBUTED SYSTEM

BACKGROUND

Computing devices such as, for example, laptop computers, personal computers, cell phones, personal digital assistants, tablet computers, or other physical computing devices may generate data. The computing devices may store generated data locally in a data storage device of the computing device. Because computing devices may fail, data stored locally in a computing device may be lost due to the failure. Similarly, stored data may be lost for other reasons such as, for example, corruption of the data, inadvertent deletion of the data by the user, or another cause.

SUMMARY

In one aspect, a production host for hosting applications in accordance with one or more embodiments of the invention includes a persistent storage and a production agent. The persistent storage stores application data of the applications. The production agent obtains a backup analysis request for an application executing on the production host; in response to obtaining the backup analysis request: obtains an identity of the application; identifies backups in a backup storage, wherein the identified backups are associated with the identity of the application; performs a backup policy compliance analysis of the identified backups to generate a backup protection map for the application.

In one aspect, a method for managing applications in accordance with one or more embodiments of the invention includes obtaining a backup analysis request for an application of the applications; in response to obtaining the backup analysis request: obtaining an identity of the application; identifying backups in a backup storage, the identified backups are associated with the identity of the application; performing a backup policy compliance analysis of the identified backups to generate a backup protection map for the application; and generating a graphical user interface based on the backup protection map.

In one aspect, a non-transitory computer readable medium in accordance with one or more embodiments of the invention includes computer readable program code, which when executed by a computer processor enables the computer processor to perform a method for managing applications. The method includes obtaining a backup analysis request for an application of the applications; in response to obtaining the backup analysis request: obtaining an identity of the application; identifying backups in a backup storage, the identified backups are associated with the identity of the application; performing a backup policy compliance analysis of the identified backups to generate a backup protection map for the application; and generating a graphical user interface based on the backup protection map.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an application in accordance with one or more embodiments of the invention.

FIG. 6.1 shows a diagram of an example system at a first point in time.

FIG. 6.2 shows a diagram of a backup protection map for a database.

FIG. 6.3 shows a diagram of an application graphical user interface.

FIG. 6.4 shows a diagram of the application graphical user interface of FIG. 6.3 after selection of a database identifier.

FIG. 6.5 shows a diagram of a backup reminder user interface.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods, for providing backup services to applications. For example, embodiments of the invention may cause backups of applications to be stored in backup storages that may be used for restoration purposes in the future. By doing so, it may be more likely that application data may be available for future use in the future when compared to scenarios in which backups of the applications are not stored.

In one or more embodiments of the invention, the applications include an enhanced graphical user interface generator. The enhanced graphical user interface generator presents information regarding the current backup state of the application to a user of the application. For example, the user interface of the application may include one or more panes or windows for display of backup status information.

In one or more embodiments of the invention, a system includes an agent that performs analysis of previously generated backups to generate a backup protection map. The backup protection map may be utilized by the enhanced graphical user interface generator to present information regarding the backup state of the application. The backup state of the application may represent whether application is sufficiently protected for restoration purposes at the current point in time.

Figure 1:
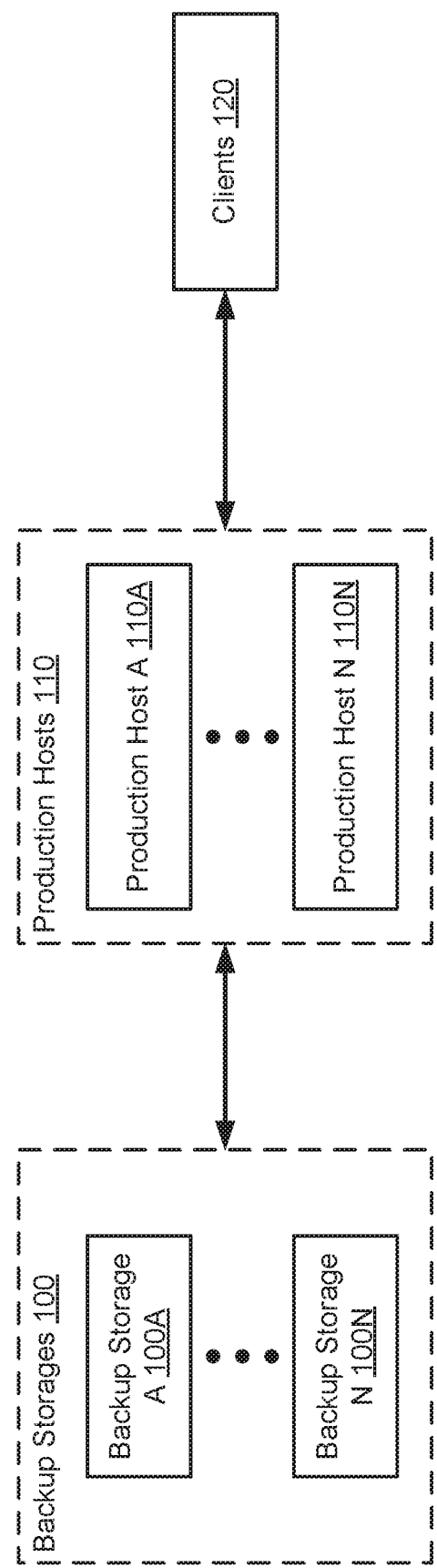
FIG. 1 shows a diagram of a system in accordance with one or more embodiments of the invention.

FIG. 1 shows an example system in accordance with one or more embodiments of the invention. The system may include backup storages (100) that store backups of applications hosted by production hosts (110). For example, the production hosts (110) may generate backups of applications hosted by production hosts (110) and send the generated backups to the backup storages (100) for storage.

The production hosts (110) may host applications that provide services to the clients (120). The applications hosted by the production hosts (110) may be any type of application that may provide services to the clients (120). For example, an application may be a database that stores information that is relevant to the clients (120).

In one or more embodiments of the invention, the production hosts (110) self-orchestrate the process of generating backups, storing the backups and backup storages (100), and/or performing restorations using backups stored in the backup storages (100). For example, the system of FIG. 1 may not include a remote agent, or other entity, separate from the production hosts (110) that orchestrates the generation of backups or performance of restorations. Rather, as will be discussed in greater detail below, the production hosts (110) may provide support services directly to applications hosted by the production hosts (110) that each include integrated backup and/or restoration functionality. By doing so, embodiments of the invention may provide integrated backup and/or restoration services to users of applications hosted by the production hosts (110). Thus, when application services of the production hosts (110) are provided to the clients (120), integrated backup and/or restoration services may be provided directly to users of the clients (120).

Each of the components of the system of FIG. 1 may be operable connected to each other and/or other entities (not shown) by any combination of wired and/or wireless networks. Each component of the system of FIG. 1 is discussed below.

The clients (120) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The clients (120) may be other types of computing devices without departing from the invention. For additional details regarding computing devices, refer to FIG. 7.

The clients (120) may be logical devices without departing from the invention. For example, the clients (120) may be virtual machines that utilize computing resources of any number of physical computing devices.

In one or more embodiments of the invention, the clients (120) utilize application services provided by applications (120) hosted by the production hosts (110). For example, the clients (120) may utilize database services, electronic communication services, file storage services, or any other type of computer implemented service provided by applications hosted by the production hosts (110). By utilizing the aforementioned services, data that is relevant to the clients (120) may be stored as part of application data of the applications hosted by the production hosts (110).

For example, consider a scenario in which a client utilizes file storage services provided by an application of the production hosts (110) by uploading an image to an application hosted by the production hosts (110). In response to receiving the uploaded image, the application may store a copy of the image locally in the production hosts (110). At a future point in time, the client that uploaded the image or another entity may desire to retrieve a copy of the image from the production hosts (110) and thereby render data, i.e., the copy of the image sort of the production hosts (110), stored in the production hosts (110) to be relevant to the clients (120). One or more embodiments of the invention may improve the likelihood that data that is relevant to the clients (120) and stored in the production hosts (110) is retrievable from the production hosts (110) at future points in time. Embodiments of the invention may provide such functionality by generating and storing backups of the production hosts, or portions of the production hosts, in backup storages (100).

In one or more embodiments of the invention, the production hosts (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The production hosts (110) may be other types of computing devices without departing from the invention. For additional details regarding computing devices, refer to FIG. 7.

In one or more embodiments of the invention, the production hosts (110) are distributed computing devices. As used herein, a distributed computing device refers to functionality provided by a logical device that utilizes the computing resources of one or more separate and/or distinct physical computing devices. For example, in one or more embodiments of the invention, the production hosts (110) may be distributed devices that include components distributed across any number of separate and/or distinct computing devices. In such a scenario, the functionality of the production hosts (110) may be performed by multiple, different computing devices without departing from the invention.

A system in accordance with one or more embodiments of the invention may include any number of production hosts (e.g., 110A, 110N) without departing from the invention.

In one or more embodiments of the invention, the production hosts (110) both (i) host applications that provide application services to the clients and (ii) self-orchestrate provision of backup services to applications hosted by the production hosts (110). The backup services may include generation of backups of the applications, storage of the generated backups of the applications in backup storages (100), and/or restoration of applications hosted by the production hosts (110) using previously stored backups of the applications stored in the backup storages (100).

In one or more embodiments of the invention, the production hosts (110) self-orchestrate provision of backup services by driving such services independently of other entities of the system of FIG. 1. For example, the system of FIG. 1 may not include a coordination point, remote agent, or other independent entity that manages provision of backup services to entities of the system of FIG. 1. Rather, the production hosts (110) may include the necessary functionality to orchestrate provisioning of backup services. For additional details regarding the production hosts (110), refer to FIG. 2.1.

In one or more embodiments of the invention, the backup storages (100) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (100) described through this application and all, or a portion, of the methods illustrated in FIG. 4-5. For additional details regarding computing devices, refer to FIG. 7.

In one or more embodiments of the invention, the backup storages (100) are distributed computing devices. As used herein, a distributed computing device refers to functionality provided by a logical device that utilizes the computing resources of one or more separate and/or distinct computing devices. For example, in one or more embodiments of the invention, the backup storages (100) may be distributed devices that include components distributed across any number of separate and/or distinct computing devices. In such a scenario, the functionality of the backup storages (100) may be performed by multiple, different computing devices without departing from the invention.

In one or more embodiments of the invention, the backup storages (100) provide data storage services to the production hosts (110). The data storage services may include storing of data provided by the production hosts (110) and providing of previously stored data to the production hosts (110).

In one or more embodiments of the invention, the data stored by the backup storages (100) includes backups of applications hosted by the production hosts (110). For example, the production hosts (110) may host a database application. To generate a backup for the database, a backup of the application data of the database application to be generated and sent to the backup storages (100) for storage. At a future point in time, it may become desirable to restore the state of the database managed by the database application to a previous state. To do so, the previously stored backup of the application data stored in the backup storages (100) may be retrieved. The retrieved backup may be used to restore the database to a state associated with the backup, i.e., the desired previous state.

While described above as storing backups of application data, the backup storages (100) may store other types of data from the production hosts (110), or other entities, without departing from the invention. For example, the backup storages (100) may store archives or other data from the clients (120) or other entities. For additional details regarding the backup storages (100), refer to FIG. 3.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

FIG. 2.1 shows a diagram of an example production host (200) in accordance with one or more embodiments of the invention. The example production host (200) may be similar to any of the production hosts (110, FIG. 1). As discussed above, the example production hosts (200) may host applications and provide backup services to the hosted applications.

To provide the aforementioned functionality of the example production host (200), example production host (200) may include applications (210), a hypervisor (220), a production agent (230), and persistent storage (240). Each component of the example production host (200) is discussed below.

Applications (210) may be any type of computer implemented application. For example, the applications (210) may be database applications, electronic communication applications, filesharing applications, and/or other types of applications. The example production host (200) may include any number of applications (e.g., 200A, 200N) without departing from the invention.

Each of the applications (210) may perform similar or different functions. For example, a first application (e.g., 210A) may be a database application and a second application (e.g., 210N) may be an electronic communications application. In another example, a first application (e.g., 210A) may be a first instance of a database application and a second application (e.g., 210N) may be a second instance of the database application.

In one or more embodiments of the invention, all, or portion, of the applications (210) provide application services to clients. The provided services may correspond to the type of application of each of the applications (210). When providing application services to the clients, data that is relevant to the clients may be received by and/or generated by the applications (210). The applications (210) may store such relevant data as part of the application data (244) associated with respective applications. The application data (244) may be stored in the persistent storage (240) of the example production host (200).

In some embodiments of the invention, portions, or all, of the application data (244) may be stored remotely from the example production host (200). For example, the application data (244) may be stored in a second production host, or another entity, that does not host the applications (210). The application data (244) may be stored in other locations without departing from the invention.

In one or more embodiments of the invention, all, or a portion, of the applications (210) include integrated backup service functionality. For example, the applications (210) include functionality to generate backups of the application data (244) and restore the applications (210) using previously generated backups.

In one or more embodiments of the invention, all, or a portion, of the applications (210) include integrated graphical user interface generation functionality as part of the integrated backup service functionality. For example, the applications (210) may include functionality to generate graphical user interfaces used to convey information regarding previously performed, ongoing, and/or future backup services to users. By doing so, embodiments of the invention may provide integrated backup service functionality for applications utilized by clients. For additional details regarding the backup services and/or integrated graphical user generation functionality of the applications (210), refer to FIG. 2.2.

In one or more embodiments of the invention, the applications (210) do not include functionality to interact with backup storages, directly, or otherwise interact with the distributed environment in which production host hosting the applications (210) resides. Thus, the applications (210) may be unable to analyze a distributed environment in which the production host hosting the applications (210) resides.

The hypervisor (220) may manage execution of the applications (210). The hypervisor (220) may instantiate and/or terminate any of the applications (210). The hypervisor (220) may also allocate computing resources of the example production host (200) to each of the applications (210A, 210N).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services. For example, the production agent (230) may orchestrate the generation of backups and storage of the generated backups in backup storage.

To provide these services, the production agent (230) may include functionality to analyze previously stored backups and backup storage and generate backup protection map (242) based on the analysis of the previously stored backups. For example, the production agent (230) may identify backups stored in backup storage associated with any of the applications (210). The production agent (230) may analyze: (i) the contents of each of the identified backups, (ii) the generation date of each of the identified backups, (iii) the state to which each of the identified backups has been used to restore an associated entity, and/or (iv) other characteristics of the backups to generate the backup protection map (242).

The backup protection map (242) may be used by the applications (210) to provide integrated backup services. For example, the applications (210) may utilize the backup protection map (242) to generate graphical user interfaces, to prompt the user of the application to initiate a backup, and/or otherwise provide integrated backup services. As used herein, integrated backup services may refer to an application that includes functionality to initiate a backup of the application, provide a user with information regarding a backup state of the application, or otherwise enable a user of the application to ensure that the application is appropriately backed up for data integrity purposes.

The production agent (230) may further include functionality to store backups generated by applications, or other entities, in backup storage and retrieve previously stored backups from backup storage. The production agent (230) may do so by utilizing identifiers of applications, or other entities. The identities of such entities may be used for both associate backups with applications and identify previously generated backups that are associated with an application.

Figure 4:
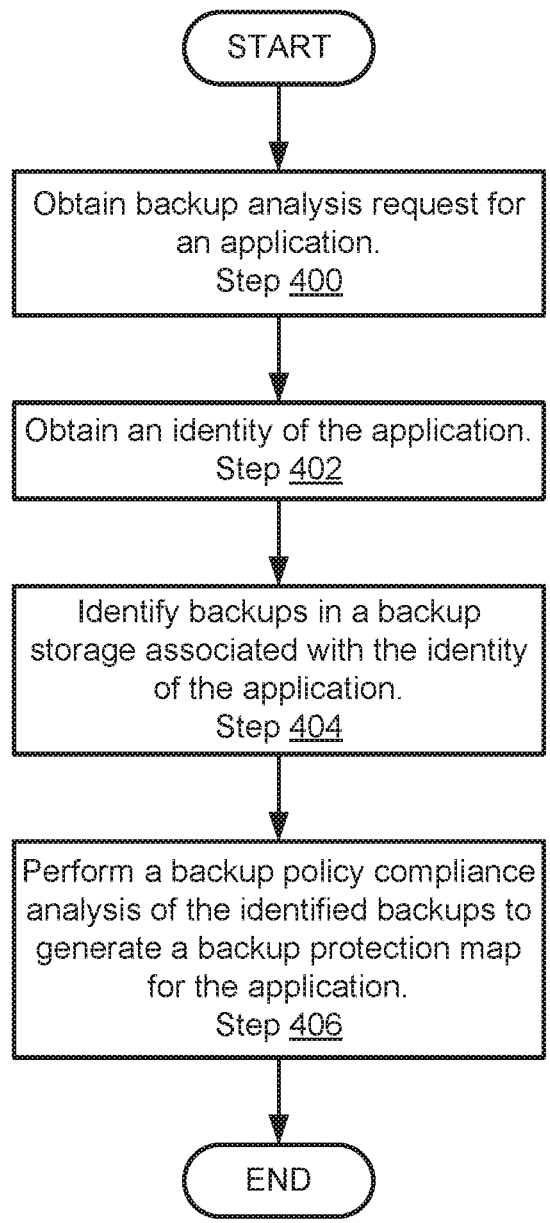
FIG. 4 shows a flowchart of a method of generating a backup policy compliance map in accordance with one or more embodiments of the invention.
Figure 5:
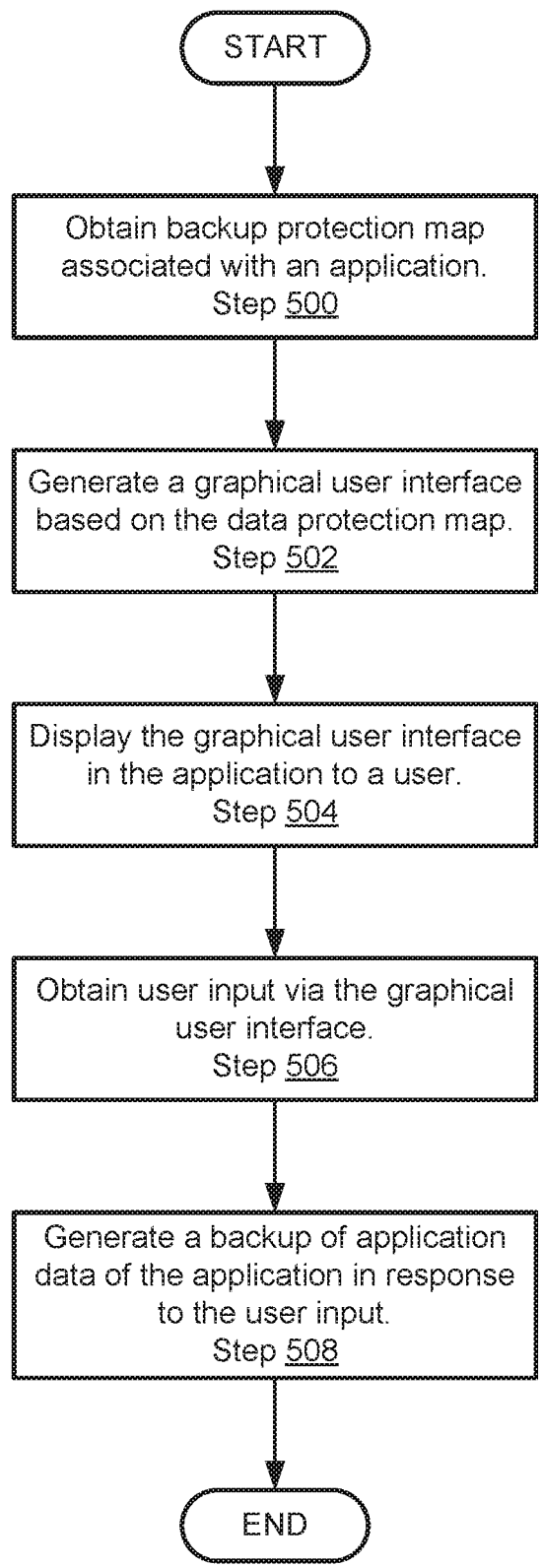
FIG. 5 shows a flowchart of a method of using a backup policy compliance map in accordance with one or more embodiments of the invention.

To provide the above noted functionality of the production agent (230), the production agent (230) may perform all, or portion, of the methods illustrated in FIGS. 4-5.

In one or more embodiments of the invention, the production agent (230) is a hardened entity, i.e., not modifiable by an entity that is remote to a production host on which the production agent (230) is executing. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

The persistent storage (240) may store data utilized by the applications (210), the hypervisor (220), or the production agent (230). The persistent storage (240) may be a physical device for storing data or maybe a virtualized storage. In a scenario in which the persistent storage (240) is a physical device, the physical device may include any number of data storage components such as, for example, hard disk drives, solid-state disk drives, tape drives, and/or other computer readable physical storage mediums. In a scenario in which the persistent storage (240) is a virtualized resource, the persistent storage (240) may utilize the computing resources of any number of hardware devices to provide data storage services.

In one or more embodiments of the invention, the persistent storage (240) stores a backup protection map (242) and application data (244). Each of these data structures is discussed below.

In one or more embodiments of the invention, the backup protection map (242) is a data structure that stores information regarding a backup state of one or more of the applications (210). The backup state of the one or more applications (210) may reflect the relative ability of an application to be restored using previously stored backups associated with the application. For example, the backup protection map (242) may include a listing of each backup associated with an application stored in backup storage. The listing may further specify relationships between each of the backups, to which points in time an application may be restored using the backups, and/or other information regarding the restoration capabilities of the application based on the previously stored backups associated with the application. The backup protection map (242) may be stored in any format, other than a list, without departing from the invention. The persistent storage (240) may store any number of backup protection maps associated with any number of applications without departing from the invention.

In one or more embodiments of the invention, the application data (244) is data associated with applications (210). For example, application data (244) may include a database associated with a database application of the applications (210). The Application data (244) may include any quantity of data associated with any of the applications (210) without departing from the invention.

While the aforementioned data structures (e.g., 242, 244) are illustrated as being stored in a persistent storage of the example production host (200), these data structures may be stored in other locations, spanned across any number of physical devices, may be broken down into any number of separate data structures, may be combined with other data, and/or stored in other formats without departing from the invention.

Additionally, while for the sake of brevity the example production host (200) has been described and illustrated as including a limited number of components, the example production host (200) may include different, fewer, and/or additional components without departing from the invention.

FIG. 2.2 shows a diagram of an example application (250) in accordance with one or more embodiments of the invention. The example application (250) may be similar to any of the applications (210, FIG. 2.1). As discussed above, an application in accordance with embodiments of the invention may provide services to clients and may include integrated backup services.

To provide the aforementioned functionality of the example application (250), the example application (250) may include an enhanced interface generator (252) and functionality modules (254). Each of these components of the example application (250) is discussed below.

The enhanced interface generator (252) may generate graphical user interfaces used in conjunction with provisioning of backup services. The enhanced interface generator (252) may generate such interfaces using backup protection maps (e.g., 242, FIG. 2.1).

For example, the example application (250) may generate user interfaces displayed to users. The generated user interfaces may include one or more windows that include information regarding the backup state of the application. Such windows may be populated using backup protection maps. The backups state application may include information regarding various previously generated backups of the application, a specific backup storages to which backups have been saved, information regarding previous recoveries performed for the application, and/or information regarding the status of backups and/or recoveries performed for the application. The backup state of the application may include additional, different, and/or less information without departing from the invention. The interfaces displayed to the user that include information regarding backup state of application may have any format that communicates the backup state of the application to the user. In one or more embodiments of the invention, the interfaces displayed to the user may include one or more lists that indicate backup state of application to the user.

In another example, the example application (250) may generate priority user interfaces that request that the user of the application provide feedback regarding the backup state of the application. The priority user interface may be a pop-up window that includes text that describes the current backup state of the application. The pop-up window may further include content with which the user may interact with to provide feedback to the application regarding the current backup state of the application. For example, the user interactive content may be a button with which a user may interact to immediately initiate a backup generation for the application. The priority user interfaces may include other types of content for the urgent display of information to a user and/or urgent obtaining a feedback from a user regarding the backup state of the application.

In a still further example, the example application (250) may generate interfaces that report information regarding ongoing data protection related activities. For example, the generated interfaces may include information regarding backups that are being generated and/or recoveries that are currently being performed. For example, in a scenario in which application is a database application that manages multiple databases, the generated interfaces may include information regarding backups and/or recoveries of each of the separate databases. Additionally, the generated interfaces may report information regarding ongoing data protection related activities may include interactive user content for obtaining input from a user. The input from the user may be solicited to enable a user to modify the current ongoing backup and/or recovery processes. For example, the generated interfaces may include user interactive content that when interacted with by a user pause one or more of the ongoing processes, delay one or more of the ongoing processes, and/or modify parameters of the one or more ongoing processes. The generated interfaces may include user interactive content to obtain user input for different reasons without departing from the invention.

To provide the above-noted functionality of the enhanced interface generator (252), the enhanced interface generator (252) may perform all, or portion, of the methods illustrated in FIGS. 4-5.

In one or more embodiments of the invention, the enhanced interface generator (252) is implemented as a module of the example application (250). For example, the enhanced interface generator (252) may be a set of instructions that when executed by a processor cause the processor to perform the functionality of the enhanced interface generator (252).

The functionality modules (254) may provide the primary functionality of the example application (250). For example, if the example application (250) is a database application, the functionality modules (254) may provide database services. The example application (250) may include any number of functionality modules (254) without departing from the invention.

In one or more embodiments of the invention, the functionality modules (254) are implemented as modules of the example application (250). For example, the functionality modules (254) may be sets of instructions that when executed by a processor cause the processor to perform the functionality of the functionality modules (254).

Figure 3:
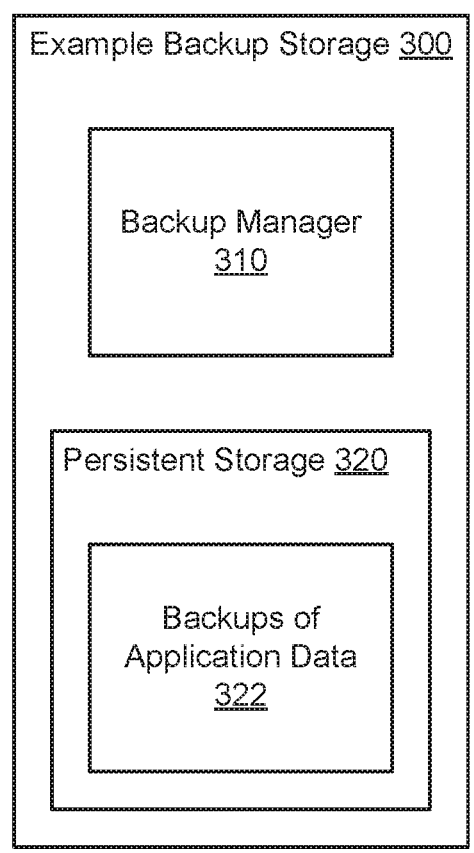
FIG. 3 shows a diagram of a backup storage in accordance with one or more embodiments of the invention.

As discussed above, backups of applications may be stored in backup storage to improve the reliability of retrieving application data at a future point in time. FIG. 3 is a diagram of an example backup storage (300) in accordance with one or more embodiments of the invention. The example backup storage (300) may be similar to any of the backup storages (e.g., 100, FIG. 1) of the system of FIG. 1. As discussed with respect to FIG. 1, backup storages may provide data storage services.

To provide the aforementioned functionality of the example backup storage (300), the example backup storage (300) may include a backup manager (310) and a persistent storage (320). Each component of the example backup storage (300) is discussed below.

The backup manager (310) may manage providing data storage services to other entities. For example, the backup manager (310) may manage storage of data from other entities in the persistent storage (320). The backup manager (310) may also manage providing of data from the persistent storage (320) to other entities. The backup manager (310) may perform all, or portion, of the methods illustrated in FIGS. 4-5.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

The persistent storage (320) may be a data storage device. For example, the persistent storage (320) may include one or more hard disk drives, solid-state drives, tape drives, and/or any other type of physical computer readable storage medium. The persistent storage (320) may be a virtualized storage without departing from the invention. For example, the persistent storage (320) may provide data storage services using computer resources of any number of physical computing devices.

In one or more embodiments of the invention, the persistent storage (320) stores backups of application data (322). For example, as noted above, the backup manager (310) may provide data storage services to any number of applications hosted by production hosts or other entities. When providing such services, the backup manager (310) may obtain backups of application data and store such data in the persistent storage (320).

While for the sake of brevity the example backup storage (300) has been described and illustrated as including a limited number of components, the example backup storage (300) may include different, fewer, and/or additional components without departing from the invention.

Returning to FIG. 1, the system may enable the production hosts (110) to self-orchestrate performance of backup services. FIGS. 4-5 illustrate methods may be performed by components of the system of FIG. 1 when self-orchestrating backup services.

While the various steps in the following flowcharts are presented and described sequentially, one of ordinary skill in the relevant art will appreciate that some or all of the steps in any of FIGS. 4-5 may be executed in a different order, may be combined or omitted, and some or all steps in any of FIGS. 4-5 may be executed in parallel.

FIG. 4 shows a flowchart of a method in accordance with one or more embodiments of the invention. The method depicted in FIG. 4 may be used to generate a backup protection map in accordance with one or more embodiments of the invention. The method shown in FIG. 4 may be performed by, for example, a production host (e.g., 110, FIG. 1). Other components of the system illustrated in FIG. 1 may perform all, or a portion, of the method of FIG. 4 without departing from the invention.

In step 400, a backup analysis request is obtained for an application.

In one or more embodiments of the invention, the backup analysis request is obtained from the application. For example, the application may send a request for a backup analysis when the application is initialized, or otherwise instantiated. In another example, the application may send a request for backup analysis when a user selects an interface for managing backup services of the application.

In one or more embodiments of the invention, the backup analysis request is obtained from a production agent. For example, the production agent when initialized, or otherwise instantiated, may be configured to automatically initiate the performance of backup analysis of applications hosted by production host. In another example, the production agent may be configured to periodically perform backup analysis of any number of applications.

In one or more embodiments of the invention, the backup analysis request specifies an identity of the application.

In step 402, an identity of the application is obtained.

As noted above, the identity of the application may be included in the backup analysis request.

In one or more embodiments of the invention, the identity of the application is obtained based on an identity of the entity that sent a request. For example, as noted above, an application may send the backup analysis request. The identity of the sender of the backup analysis request may be used as identity of the application. The identity of the application may be obtained via other methods without departing from the invention.

In step 404, backups in a backup storage associated with the identity of the application are identified.

In one or more embodiments of the invention, the backups are identified by sending a request to a backup storage for a list of all backups associated with the identity of the application. In response, the backup storage may analyze backups of application data stored in the backup storage to identify backups associated with the identity of the application, populate a list based on the analysis, and send the populated list in response to the request.

In one or more embodiments of the invention, the list includes additional information regarding each of the backups specified in the list. For example, additional information may include (i) to which point in time a backup to be used to restore an application, (ii) relationships between the backups such as, for example, limitations on using the backups for restoration purposes (e.g., dependencies between the backups that require multiple backups to be present to use a particular backup for restoration purposes), (iii) when a backup was generated, (iv) when a backup was stored in backup storage, and/or (v) a size of the backup. Such additional information may be included for each of the backups associated with the identity of the application. The list may include additional, less, and/or different information regarding the backups without departing from the invention.

In step 406, a backup policy compliance analysis of the identified backups is performed to generate a backup protection map for the application.

In one or more embodiments of the invention, the backup policy compliance analysis compares characteristics of the backups to one or more backup policies associated with the application. The backup policies may specify the characteristics of the backups that must be met to comply with the backup policies. For example, the backup policies may specify (i) when backups are to be generated (e.g., periodically, in response to events, at predetermined points in time, dynamically, etc.), (ii) where generated backups are to be stored (e.g., an identity of a backup storage for storing the backups), (iii) how long each of the generated backups are to be kept (e.g., a retention period), (iv) limitations on dependencies between the backups (e.g., limits on the number of backups that may depend on each other), (v) a level of storage redundancy for the backups (e.g., how many copies of the backups are required to be stored in any number of separate backup storages for redundancy purposes), (vi) a maximum period of time that the application may execute without generation of a backup (e.g., how long after instantiation of the application the application may execute before a backup must be generated), and/or (vii) a maximum period of time that may elapse between when a previous backup is generated and when an additional backup must be generated. The backup policies may specify additional, different, and/or fewer characteristics of the backups that must be met to comply with the backup policies without departing from the invention. The outcome of the comparison is (A) a determination regarding whether the identified backups comply with the one or more backup policies and/or (B) one or more actions that must be performed to bring the identified backups into compliance with the one or more backup policies.

The backup policies may be stored on a production host, or another entity, of a system as illustrated in FIG. 1. The backup policies may be specified by a user, a system administrator, or any other entity.

In one or more embodiments of the invention, the backup protection map is generated based on the outcome of the backup policy compliance analysis and/or characteristics of the identified backups. The backup protection map may be a data structure that includes information regarding the outcome of the backup policy compliance analysis. The backup protection map may specify whether the identified backups comply with one or more backup policies and, if the identified backups do not comply with the backup policies, include one or more actions that must be performed to bring identified backups into compliance with the one or more backup policies.

The backup protection map may also include characteristics of the backups obtained in step 404. For example, the backup protection map may specify the last time a backup for the identified application was generated and stored in backup storage. In a scenario in which the identified application manages multiple data structures, e.g., a database application that manages multiple databases, the backup protection map may specify the last time a backup of each of the databases managed by the identified application was generated and stored in backup storage. The database protection map may include any number of characteristics of the backups without departing from the invention.

The method may end following step 406.

By generating the backup protection map, embodiments of the invention may enable individual applications to self-orchestrate backup services by using the generated backup protection map. For example, components of applications such as enhanced interface generators may utilize the generated backup protection map to natively provide backup services within each application. Thus, embodiments of the invention may enable new services, directly integrated into applications, to be provided. Users of applications may directly control, modify, or otherwise utilize backup services of the applications while being provided information regarding a backup solution implemented across a distributed system. Accordingly, embodiments of the invention may provide a new method organizing components of a backup generation solution that segregates duties in an unconventional manner. For example, conventional systems for providing backup services may utilize external consoles or other entities separate from that of an application for managing backup services within a distributed environment.

FIG. 5 shows a flowchart of a method in accordance with one or more embodiments of the invention. The method depicted in FIG. 5 may be used to manage integrated backup services of an application in accordance with one or more embodiments of the invention. The method shown in FIG. 5 may be performed by, for example, a production host (e.g., 110, FIG. 1). Other components of the system illustrated in FIG. 1 may perform all, or a portion, of the method of FIG. 5 without departing from the invention.

In step 500, the backup protection map associated with an application is obtained.

In one or more embodiments of the invention, the backup protection map associated with the application is obtained by sending a request for generation of the backup protection map. For example, the request may be sent to an entity that performs the method illustrated in FIG. 4.

In one or more embodiments of the invention, the backup protection map associated with the application is obtained from a persistent storage. For example, the backup protection map may be stored in a repository that stores any number of backup protection maps for any number of applications. The repository may be stored in the persistent storage.

In step 502, the graphical user interface is generated based on the backup protection map.

In one or more embodiments of the invention, user interface displays a summary of the information in the backup protection map. The summary may specify, for example any backup and/or recoveries currently being performed with respect to the application. The summary may specify, for example, characteristics of each existing backup such as when the backup was generated, where the backup is being stored, and/recoveries performed using the backup. The summary may include additional, different, and/or less information without departing from the invention.

In one or more embodiments of the invention, the user interface includes user interactive content for obtaining user input. For example, the user interface may include widgets such as radio buttons, checkboxes, and/or input fields with which a user may interact. By interacting with the widgets, input from the user may be obtained.

In one or more embodiments of the invention, the interactive content requests that a user initiate a backup generation. For example, when the backup protection map indicates that backups associated with an application do not comply with the backup policy, the interactive content may request that user initiate an action to modify the backups comply with the backup policy. Such action may include initiating the generation of a backup, scheduling generational backup for appointment time in the future, or otherwise modifying an existing backup. The action may be other types of actions regarding backups associated with application without departing from the invention.

In one or more embodiments of the invention, the user interface may be a priority user interface. For example, the priority user interface may be a pop-up window that obscures other windows of the application. By doing so, the application may effectively communicate to the user that actions should be taken to correct the backup state of backups or communicate other important information to the user in a prioritized manner.

In one or more embodiments of the invention, the user interface may be a window within multiple windows of an application. For example, user interface may be a window that is displayed next to other windows of the application. Multiple user interfaces for managing backup services of the application may be displayed concurrently without departing the invention. For example, a first user interface may display a list of data structures, such as databases, that are managed by the application. When a user selects one element of the list, a second user interface may be populated with content related to the selected one element of the list.

For example, consider a scenario in which the application is a database application that manages multiple databases. In this scenario, a listing of each of the multiple databases may be displayed in a list in a first user interface. When a user selects an element of the list, a second user interface may be populated with information regarding the backups associated with the database identified by the selected element of the list. Further, the second user interface may also include interactive content that when selected by a user causes a third user interface to be populated with information regarding one particular backup of the backups associated with a database. For additional details regarding graphical user interfaces, refer to the example illustrated in FIGS. 6.1-6.5.

In step 504, the graphical user interface is displayed in the application to a user.

In one or more embodiments of the invention, the graphical user interface is displayed in a pane of a window of the application. The graphical user interface to be displayed to a user via other methods and in other manners without departing from the invention.

In one or more embodiments of the invention, displaying the graphical user interface to the user informs the user of currently ongoing backup and/or recovery processes being performed for the application.

In one or more embodiments of the invention, displaying the graphical user interface to the user informs the user of historical data, or other characteristics, regarding backups associated with application.

In one or more embodiments of the invention, displaying the graphical user interface to the user prompts the user to initiate actions that cause backups to be generated and/or backups associated with application to be modified. Such generation and/or modification may cause the backups associated with application to comply with backup policies associated with application In step 506, user input is obtained via the graphical user interface.

In one or more embodiments of the invention, user input is obtained via user interactive content displayed within the graphical user interface. For example, the graphical user interface may include one or more widgets with which a user may interact and thereby provide user input to the application. User interactive content may be displayed in conjunction with information regarding the backups so that the user may make an informed decision regarding whether to initiate a backup or otherwise initiate actions with respect backup services. By doing so, embodiments of the invention may provide integrated backup services within applications.

In one or more embodiments of the invention, the obtained user input requests that a backup of application data associated with application be generated. By doing so, a user may initiate a backup generation for an application within the application itself rather than using another program or other interface.

In one or more embodiments of the invention, the obtained user input requests that a backup of application data associated with an application be generated at a future point in time. By doing so, a user may schedule a backup to be generated at a future point in time within the application itself rather than using another program or other interface.

In one or more embodiments of the invention, the obtained user input requests that a modification to an existing backup be performed. For example, the modification may be a deletion of an existing backup. By doing so, a user may modify backups usable for restoration purposes associated with the application from within the application itself rather than using another program or other interface.

In one or more embodiments of the invention, the obtained user input requests that restoration of the application be performed. By doing so, the state of application data of application may be restored to a prior state. Obtained user input may specify the desired prior state. By doing so, a user may restore an application to a previous state from within the application itself rather than using another program or other interface.

The obtained user input may request that other types of actions than those discussed above be performed without out departing from the invention. Additionally, the user input may be obtained via any number, type, and combination of widgets without departing from the invention.

In step 508, a backup of application data of the application is generated in response to the user input.

In one or more embodiments of the invention, the generated backup reflects the current state of the application data. For example, the generated backup may be an image of application data.

In one or more embodiments of the invention, generated backup reflects changes to the application data over a predetermined period of time. The predetermined period of time may be the period of time from which a previously generated backup was generated.

In one or more embodiments of the invention, generating the backup of the application data includes sending a message to a production agent that requests storage of the generated backup in a backup storage. In response to receiving the request, the production agent may store the generated backup in the backup storage.

The method may end following step 508.

To further clarify aspects of embodiments of the invention, a nonlimiting example is shown in FIGS. 6.1-6.5. These figures may illustrate a system similar to that of FIG. 1. The system may perform all, or a portion, of the methods illustrated in FIGS. 4-5.

EXAMPLE

Consider a scenario as illustrated in FIG. 6.1 where a backup storage (600) that stores backups (602) of a database application (612) hosted by a production host (610). The production host (610) may host a production agent (614) that provides backup services to the database application (612). The database application (612) include an enhanced interface module (not shown).

At a point in time, the production agent (614) obtains a request for a backup analysis of the database application (612). In response, the production agent (614) performs the method illustrated in FIG. 4. By performing the method, the production agent (614) generates a backup protection map for the database (620) as illustrated in FIG. 6.2. The backup protection map for the database (620) includes an identifier of the old database backup (622).

After the backup protection map of the database is generated, the enhanced interface module of the database application generates an application graphical user interface (630) as illustrated in FIG. 6.3. The application graphical user interface (630) includes database identifiers (e.g., 632, 634) of each of the databases supported by the database application. Additionally, application graphical user interface (630) includes a backup control screen (640) that may be populated with information regarding the backup state of each of the identified databases when either of the database identifiers (e.g., 632, 634) are selected by user. After generation of the application graphical user interface (630), the user selects the first database identifier (632).

In response to the selection, the enhanced interface generator populates the backup control screen (640) as illustrated in FIG. 6.4. The populated backup control screen (640) includes an identifier of the old database backup (622). By doing so, the user of the application is notified of the backup state of the application natively within the application.

At a second point in time, the enhanced interface generator identifies that the database application is no longer in a backup state that is compliant with backup policies associated with the database application. In response, the enhanced interface generator generates a backup reminder user interface (650) is illustrated in FIG. 6.5.

The backup reminder user interface (650) includes an identifier of the old database backup (622) and controls for initiating a backup generation for the application. The first backup initiation control (652), when selected by user, initiates a backup generation immediately. In contrast, the second backup initiation control (654), when selected by the user, delays generation of the backup to a future point in time. But explain the backup reminder user interface (650), the user of the application may natively initiate a backup generation or may delay initiation of the backup generation for future period of time that may be more convenient.

END OF EXAMPLE

Figure 7:
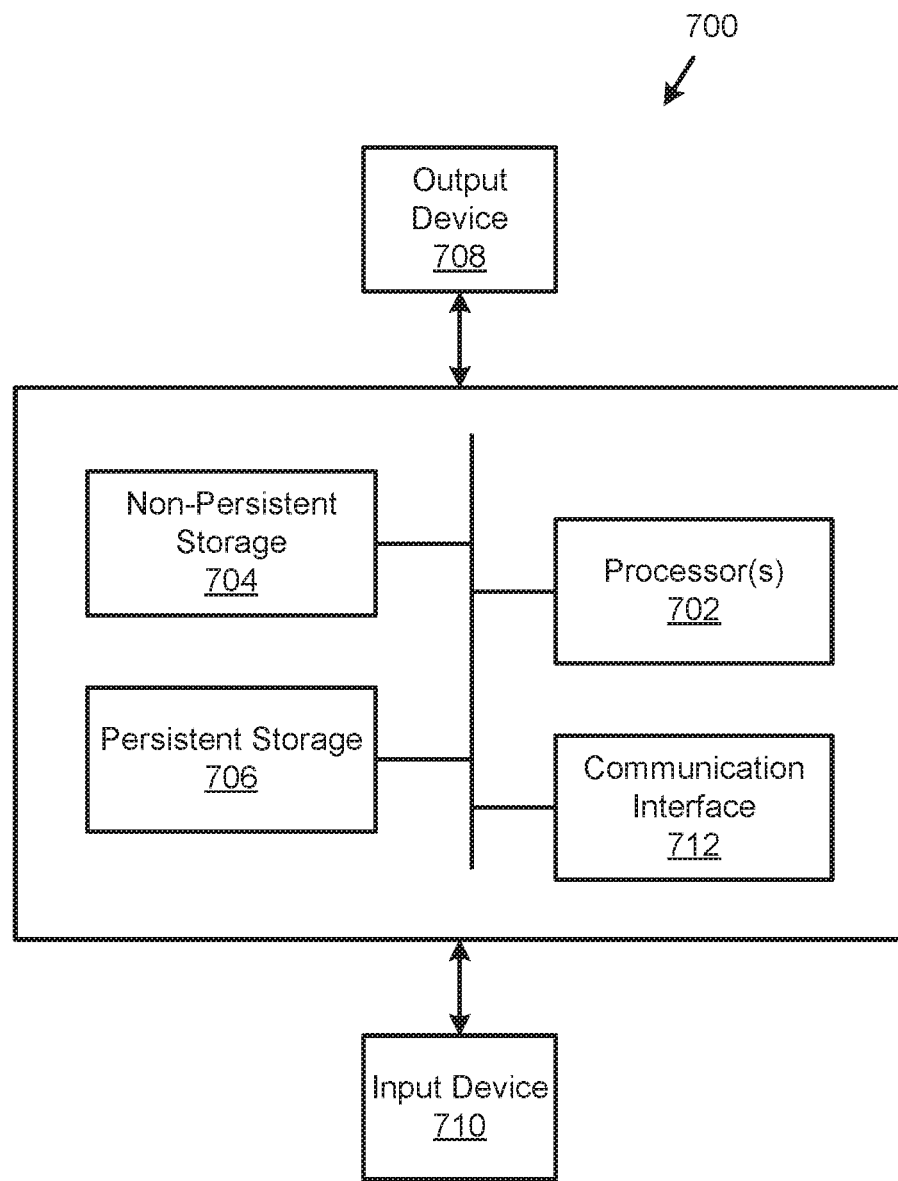
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide an improved method for providing backup services within a distributed environment. For example, embodiments of the invention may provide application integrated backup services. Such services may decrease the cognitive burden on a user of an application, when compared to contemporary methods that utilize external consoles or other interfaces, for ensuring that backups of application data are generated.

Additionally, embodiments of the invention address the problem of backups within a distributed system to which applications do not have global access. For example, embodiments of the invention may provide a new topology for providing backup services in a distributed environment. The new topology may include a local production agent that generates data structures reflective of a distributed backup environment that includes backup storages that store backups separately from production hosts that host applications. By doing so, applications hosted by production hosts may obtain information regarding the distributed backup environment. Accordingly, embodiments of the invention may directly address problem of limited rights of applications in a distributed environment.

Thus, embodiments of the invention may address problems that arise due to the technological environment of the distributed system in which all entities within the system to not have all rights to access information throughout the system. Further, embodiments of the invention may address the problem of cognitive burdens placed on users of distributed systems. Due to the nature of a distributed system, it may be difficult or otherwise be possible for a user of an application within a distributed environment to effectively manage backup services within the environment because the user may not have access permissions to consoles or other applications that control the backup services offered by the distributed environment. By providing application integrated backup services, embodiments of the invention may decrease the cognitive burden on a user by providing relevant information regarding backup services to the user directly within an application to which the user has access. By doing so, embodiments of the invention may enable user level control of backup services that would otherwise not be possible due to permission issues within the distributed environment.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

In some cases, elements within figures may be labeled as 1-N. For such listings, the elements should be understood as being any number of such elements. Further, similarly labeled elements may have different numbers of such elements. For example, if the number of processors is labeled as 1-N and the number of memory modules is labeled as 1-N, the number of processors may be the same number or a different number from that of the number of memory modules. Additionally, elements described throughout this application using a plural form should be understood as including from 1-N of such elements. For example, the recitation "processors" should be understood as including any number of processors from 1-N.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting applications, comprising:
a persistent storage that stores application data of the applications; and
a production agent programmed to:
obtain a backup analysis request for an application executing on the production host;
in response to obtaining the backup analysis request:
obtain an identity of the application;
identify backups in a backup storage, wherein the identified backups are associated with the identity of the application;
perform a backup policy compliance analysis of the identified backups to generate a backup protection map for the application, wherein the backup policy compliance analysis comprises:
identifying dependencies between the identified backups;
determining whether the identified dependencies violate a limit on the number of identified backups that may depend on each other; and
wherein the application comprises: an enhanced graphical user interface generator programmed to:
generate a graphical user interface based on the backup protection map,
wherein the graphical user interface comprises historic backup generation information regarding the application and is displayed as a timeline comprising markers that indicate when previously generated backups were previously generated,
wherein the graphical user interface comprises an indicator of a state of an ongoing backup service for the application, and
wherein the ongoing backup service is one selected from a group consisting of performance of a backup generation for the application and performance of a restoration for the application.

2. The production host of claim 1, wherein the enhanced graphical user interface generator is further programmed to:
display the graphical user interface in the application to a user;
obtain user input from the user via the graphical user interface; and generate a backup of application data of the application in response to the user input.

3. The production host of claim 1, wherein the historic backup generation information comprises a location where each of the backups are located in the backup storage.

4. The production host of claim 3, wherein the backup storage comprises multiple separate backup storage devices, wherein a first backup of the backups is stored in a first backup storage device of the multiple separate backup storage devices, and wherein a second backup of the backups is stored in a second backup storage device of the multiple separate backup storage devices.

5. A method for managing applications, comprising:
obtaining a backup analysis request for an application of the applications;
in response to obtaining the backup analysis request:
obtaining an identity of the application;
identifying backups in a backup storage, wherein the identified backups are associated with the identity of the application;
performing a backup policy compliance analysis of the identified backups to generate a backup protection map for the application, wherein the backup policy compliance analysis comprises:
identifying dependencies between the identified backups; determining whether the identified dependencies violate a limit on the number of identified backups that may depend on each other; and
generating a graphical user interface based on the backup protection map, wherein the graphical user interface comprises historic backup generation information regarding the application and is displayed as a timeline comprising markers indicates when previously generated backups were previously generated,
wherein the graphical user interface comprises an indicator of a state of an ongoing backup service for the application, and
wherein the ongoing backup service is one selected from a group consisting of performance of a backup generation for the application and performance of a restoration for the application.

6. The method of claim 5, further comprising: displaying the graphical user interface in the application to a user; obtaining user input from the user via the graphical user interface; and generating a backup of application data of the application in response to the user input.

7. The method of claim 5, wherein the historic backup generation information comprises a location where each of the backups are located in the backup storage.

8. The method of claim 7, wherein the backup storage comprises multiple separate backup storage devices, wherein a first backup of the backups is are stored in a first backup storage device of the multiple separate backup storage devices, and wherein a second backup of the backups are stored in a second backup storage device of the multiple separate backup storage devices.

9. A non-transitory computer readable medium comprising computer readable program code, which when executed by a computer processor enables the computer processor to perform a method for managing applications, the method comprising:

obtaining a backup analysis request for an application of the applications;
in response to obtaining the backup analysis request:
  obtaining an identity of the application;
  identifying backups in a backup storage, wherein the identified backups are associated with the identity of the application;
  performing a backup policy compliance analysis of the identified backups to generate a backup protection map for the application, wherein the backup policy compliance analysis comprises:
    identifying dependencies between the identified backups;
      determining whether the identified dependencies violate a limit on the number of identified backups that may depend on each other; and
  generating a graphical user interface based on the backup protection map, wherein the graphical user interface comprises historic backup generation information regarding the application and is displayed as a timeline comprising markers indicates when previously generated backups were previously generated,
  wherein the graphical user interface comprises an indicator of a state of an ongoing backup service for the application, and
  wherein the ongoing backup service is one selected from a group consisting of performance of a backup generation for the application and performance of a restoration for the application.

10. The non-transitory computer readable medium of claim 9, wherein the method further comprises:
  displaying the graphical user interface in the application to a user;
  obtaining user input from the user via the graphical user interface; and
  generating a backup of application data of the application in response to the user input.

\* \* \* \* \*